United States Patent [19]

Despres et al.

[11] Patent Number: 4,983,142
[45] Date of Patent: Jan. 8, 1991

[54] DOUBLE DAMPED FLYWHEEL, ESPECIALLY FOR AUTOMOTIVE VEHICLES

[75] Inventors: Dominique Despres, Clichy; Jacky Naudin, Ermont; Jacques Paquin, Villeneuve-la-Garenne, all of France

[73] Assignee: Valeo, Paris, France

[21] Appl. No.: 301,067

[22] Filed: Jan. 25, 1989

[30] Foreign Application Priority Data

Jan. 25, 1988 [FR] France .................. 88 00804

[51] Int. Cl.⁵ .................. F16D 3/14; F16F 15/12
[52] U.S. Cl. .................. 464/68; 74/574; 192/106.2
[58] Field of Search .................. 74/574; 192/106.2; 464/24, 66, 67, 68

[56] References Cited

U.S. PATENT DOCUMENTS

| | | | |
|---|---|---|---|
| 4,302,951 | 12/1981 | Fall et al. | 464/66 |
| 4,351,167 | 9/1982 | Hanke et al. | 464/68 X |
| 4,585,427 | 4/1986 | Lamarche | 464/67 |
| 4,668,207 | 5/1987 | Koshimo | 464/68 X |
| 4,702,721 | 10/1987 | Lamarche | 464/66 X |
| 4,767,380 | 8/1988 | Chasseguet et al. | 464/68 |
| 4,788,884 | 12/1988 | Reik et al. | 464/68 X |
| 4,790,792 | 12/1988 | Bopp | 464/66 |
| 4,828,533 | 5/1989 | Focqueur et al. | 464/68 X |
| 4,850,932 | 7/1989 | Kagiyama et al. | 464/68 |

FOREIGN PATENT DOCUMENTS

| | | |
|---|---|---|
| 3322374 | 1/1985 | Fed. Rep. of Germany ........ 464/66 |
| 2113803 | 8/1983 | United Kingdom . |
| 2175067 | 11/1986 | United Kingdom . |

Primary Examiner—Joseph J. Hail, III
Assistant Examiner—William G. Battista, Jr.
Attorney, Agent, or Firm—Charles E. Brown; Charles A. Brown

[57] ABSTRACT

The present invention is concerned with a double damped flywheel of the kind having springs (40), at least one damper plate (30) and guide rings (17, 18). The double flywheel is characterized by a phasing device having thrust pads each of which is interposed circumferentially between two consecutive ones of the resilient springs, the phasing device being mounted for free rotation with respect to the guide rings. The damper plate is centered directly or indirectly by one of the guide rings or by the damper plate in such a way as to divide each of the resilient springs into two operative elements. The double damped flywheel further comprises inserts mounting the resilient springs pivotally on the thrust pads.

8 Claims, 2 Drawing Sheets

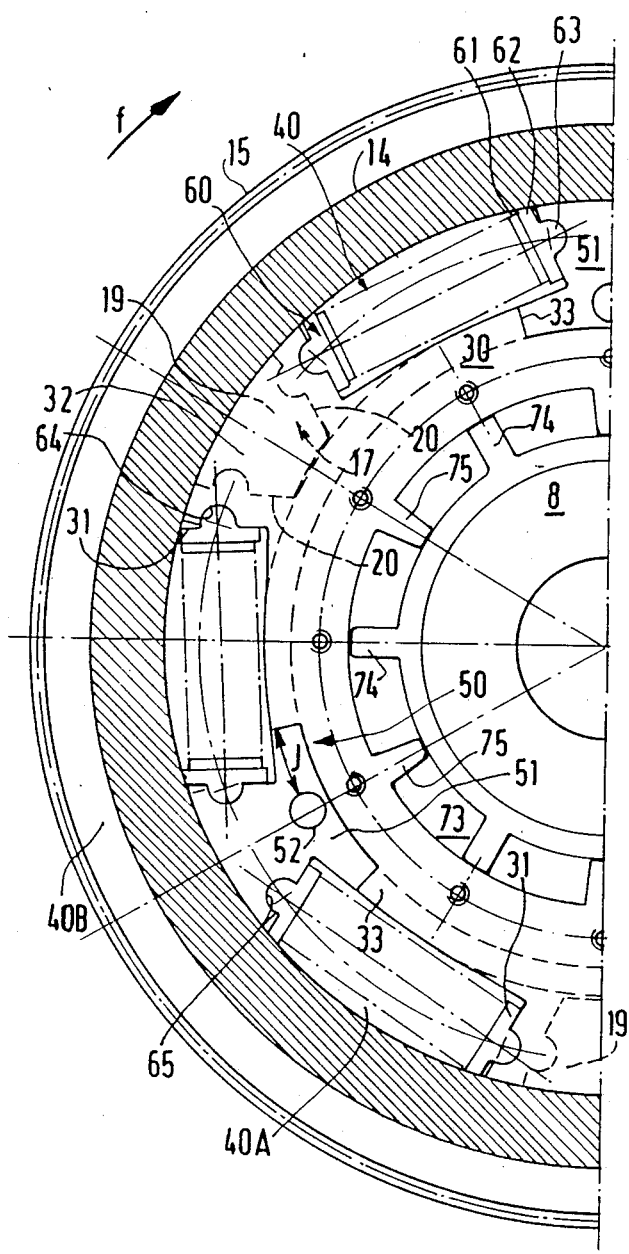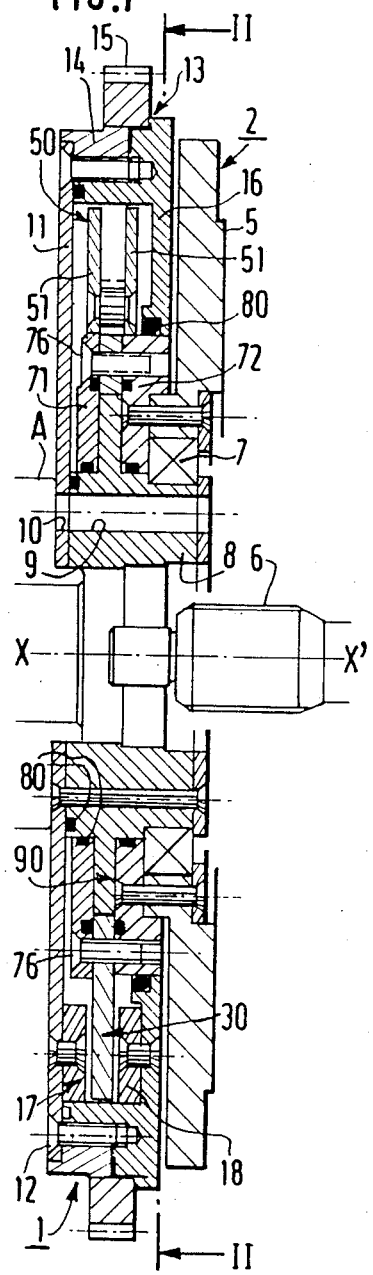

DOUBLE DAMPED FLYWHEEL, ESPECIALLY FOR AUTOMOTIVE VEHICLES

FIELD OF THE INVENTION

The present invention is concerned with a double damped flywheel, especially for an automotive vehicle, comprising two coaxial masses which are mounted so as to be movable with respect to each other against the action of circumferentially acting resilient means.

BACKGROUND OF THE INVENTION

In double flywheels, there is a need for large angular displacements between the two rotating masses. For a given capacity to transmit torque, the greater the displacement, the more must the resilient means be elongated, to such an extent that an impossible situation is soon reached.

In addition, for a given arrangement of the resilient means, it is important not to add to the radial bulk of the arrangement to the detriment of the mass of the flywheel lying radially outside the resilient means, since this would increase the value of the resonant frequency.

SUMMARY OF THE INVENTION

An object of the present invention is to remedy these disadvantages, and thus to create an arrangement in which the angular displacement between the two rotating masses can be increased, while at the same time obtaining other advantages.

According to the invention, there is provided a double damped flywheel, particularly for an automotive vehicle, of the kind comprising two coaxial masses mounted rotatably with respect to each other against the action of circumferentially acting resilient means such as coil springs, wherein a first one of the said masses includes two guide rings having first thrust faces for the said resilient means, while the second one of the said masses has at least one damper plate disposed axially between the said guide rings and radially within an axially extending outer ring portion of the first mass, the damper plate having second thrust faces for the said resilient means, the flywheel being characterised by phasing means having thrust pads each of which is interposed circumferentially between two consecutive ones of the said resilient means, the said phasing means being mounted for free rotation with respect to the guide rings and the damper plate, being centred directly or indirectly by one of the said guide rings or by the damper plate in such a way as to divide each of the said resilient means into two operative elements, and the flywheel further comprising inserts mounting the said resilient means pivotally on the thrust pads.

The angular displacement between the two masses is increased by virtue of the phasing means provided in accordance with the invention, which allow a plurality of circumferentially acting resilient means to operate sequentially.

The phasing means may comprise a support ring for the thrust pads. This ring may extend in the plane of the damper plate, for example radially outside the resilient means. In this case, since the double damped flywheel includes a heavy peripheral portion, this heavy portion is formed in two parts such as to form a throat and to accommodate the support ring, with the resilient means arranged closer to the outer periphery than to the axis of rotation of the flywheel.

The inserts for the springs enable the radial bulk of the phasing means to be reduced, in such a way that with a given arrangement of the resilient means, it is possible to arrange more of the mass of the flywheel closer to the axis of rotation, and thus to reduce the resonant frequency.

According to another feature of the invention, the resilient means are disposed within a sealed cavity which is filled at least partially with a lubricating fluid for the resilient means, so as to reduce wear and noise and to protect the resilient means.

It will be appreciated that this is made possible by virtue of the phasing means which are provided according to the invention. For a given axial spacing, when the resilient means are disposed within a sealed cavity, then, for example in the case where the resilient means take the form of coil springs, the effect is that the diameter of these springs can be reduced. It becomes no longer possible to observe specifications, especially in regard to the torque to be transmitted and the angular displacement to be obtained between the two parts. By virtue of the phasing means, it is possible ultimately to transmit the same torque as with unlubricated springs of larger diameter, while at the same time having at least the same relative angular displacement between the two masses.

Advantageously, when there is a requirement for the resilient means to act only after the clearance has been taken up at the dead point, each resilient means divided into two, e.g. into a pair of resilient elements, according to the invention is located between two of the said first thrust faces of the guide rings, with a clearance between the outer end of each resilient element of the pair and the associated first thrust face, the inner ends of these elements engaging, without clearance, two said second thrust faces of the damper plate. Using this arrangement, it is possible to construct a sub-assembly consisting of the damper plate, phasing means and resilient means, which can easily be moved axially into position within the guide rings.

It is of course possible to construct the opposite arrangement, in which the divided resilient means are mounted without clearance between the resilient elements and the first thrust faces, and with clearance between the resilient elements and the second thrust faces.

It is also possible, with advantage, to provide the double flywheel with a viscous damping means having a cavity filled partly with a viscous fluid, different from the lubricating fluid for the resilient means. The characteristics of the lubricating fluid are not always favourable for viscous damping purposes.

Preferably, the damper plate defines the said cavity. It is then possible to construct a sub-assembly consisting of the damper plate, viscous damping means, phasing ring and resilient means. In this case, the phasing means may be made in two parts, arranged on either side of the damper plate and internally centred by means of discs carried by the damper plate and delimiting the sealed cavity.

The phasing means may then consist for example of two support rings with thrust pads, connected to each other radially outside the damper plate and in the plane of the latter.

In a modification, separate thrust pads may be provided, centred by the said discs and connected to each other by spacer bars.

According to an equally important feature, the successive resilient means according to the invention may have different values of stiffness, with delayed action coupling means, defining a clearance for initial relative rotational displacement, being provided between the damper plate and the phasing means. Such delayed action coupling means can of course be provided between the guide rings and the phasing means when, in the opposite arrangement to that described above, the split or divided resilient means are located without clearance between the first thrust faces associated with the guide rings.

Nevertheless, with large differences in stiffness for example, the angular displacement can be increased still more since, during a first phase of operation, the less stiff element of a pair in the split resilient means, bearing either on the damper plate or on the guide rings, also bears on the guide rings or the damper plate respectively, indirectly through the more stiff element of the resilient means. The less stiff element is then compressed virtually by itself, by virtue of the difference in the values of stiffness, until such time as the clearance in the delayed action coupling means is taken up and until the other element of the resilient means is then compressed, again by itself, during a second operating phase.

It should be understood, however, that in certain applications, the elements of the resilient means may have values of stiffness which are very close to each other. Nevertheless, during the second operating phase one of the elements of each pair does remain compressed in the state in which it finds itself at the end of the first phase.

The description which follows explains two embodiments of the invention, by way of example only, and with reference to the accompanying drawings.

BRIEF DESCRIPTION OF THE DRAWINGS

FIG. 1 is a view in axial cross section of a double flywheel damper for an automotive vehicle according to the invention. FIG. 2 is a view in cross section taken on the line II—II in FIG. 1.

DESCRIPTION OF PREFERRED EMBODIMENTS

Figure 4:
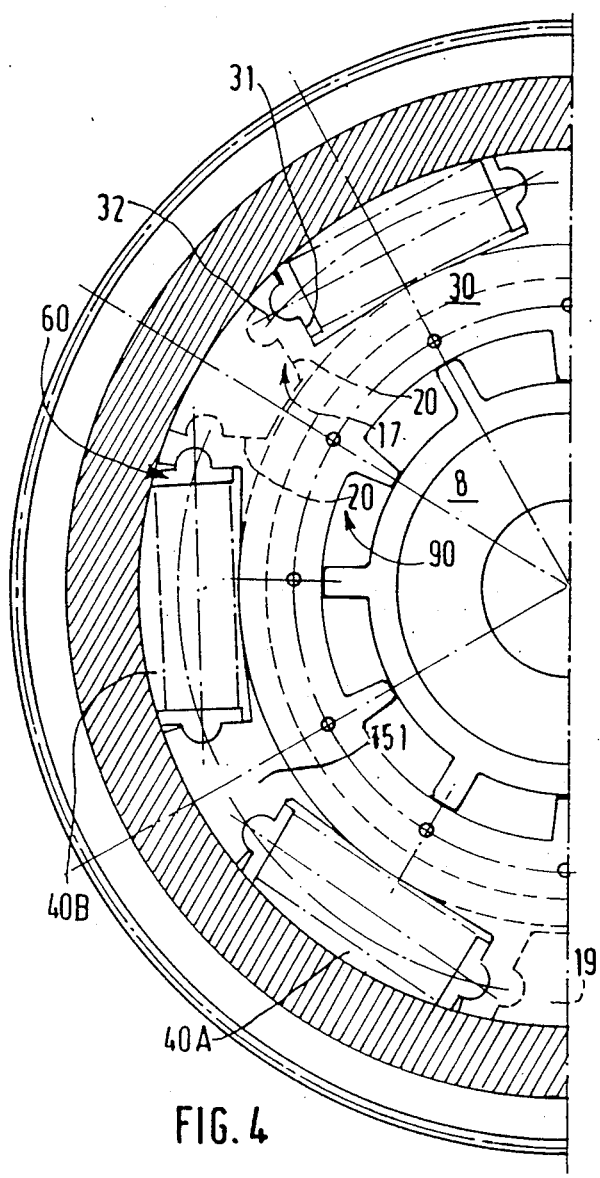
FIGS. 3 and 4 are views similar to FIGS. 1 and 2 respectively, showing another embodiment.

In the embodiments shown in the drawings, a first mass 1, secured to the nose A of the crank shaft of the engine of an automobile, is mounted coaxially with, and rotatably with respect to, a second mass 2, against the action of circumferentially acting resilient means 40.

The mass 2 comprises a reaction plate 5, on which a friction disc (not shown) of a clutch is arranged to act. The clutch friction disc is secured to the input shaft 6 of the gearbox of the vehicle, for rotation therewith.

The reaction plate 5 is mounted on a rolling bearing 7 which is interposed radially between the plate 5 and a central, annular hub 8. The hub 8 is fastened to the nose A by means of screws, not shown, passing through openings 9 in the nose A and openings 10 which are formed in a transversely extending face plate 11.

The face plate 11 is connected by means of screws 12 to a heavy hollow member 13, which may for example be a casting and which includes a heavy, axially extending, outer ring portion 14 carrying an external gear ring 15. The ring portion 14 is integral with a radial body portion 16 of the member 13, parallel to the face plate 11.

The face plate 11 and body portion 16 carry guide rings 17 and 18 respectively, secured thereto in this example by rivets. The guide rings 17 and 18 are in this embodiment formed of a plurality of blocks 19 terminating in first thrust faces 20.

A damper plate 30, provided with second thrust faces 31 of the second mass 2, is arranged between the face plate 11 and the body portion 13. The damper plate 30 is secured by riveting, in the manner described below, to the reaction plate 5.

In this example, the second thrust faces 31 delimit a plurality of radial arms 32, which are disposed facing the blocks 19. Resilient means, here in the form of springs 40, are interposed between the second thrust faces 31 and the first thrust faces 20. In accordance with the invention, phasing means 50, comprising a plurality of thrust pads 51, are interposed circumferentially between two consecutive springs 40. These phasing means 50 are mounted so as to be freely rotatable with respect to the guide rings 17 and 18 and with respect also to the damper plate 30, and are centred directly or indirectly on one of these members.

As will be understood from the foregoing, the resilient means are thus divided into two, i.e. into pairs of springs 40A, 40B, each of which bears at one of its ends on the damper plate 30 and/or on the guide rings 17 and 18, while at its other end each of these springs bears on the appropriate thrust pad 51.

The arms 32 are, in this example, wider in the circumferential direction than the blocks 19, as can be seen from FIG. 2 (though of course the reverse is also possible), in such a way that the springs 40A and 40B become compressed only after a clearance J has been taken up, i.e. at the dead point.

In this embodiment the resilient means comprise coil springs 40A and 40B, with the spring 40A engaging endwise on the thrust face 31 of a first arm 32 and on a thrust pad 51, while the spring 40B bears endwise on a thrust pad 51 and on the thrust face 31 of a second arm 32. The spring 40A is less stiff than the spring 40B.

The phasing means 50 comprise a plurality of pairs of the thrust pads 51, which are connected to each other by means of spacer bars 52 and which are disposed on either side of the plane of the damper plate 30. The latter is provided with teeth 33 for cooperating with the spacer bars 52 after the clearance J has been taken up. The teeth 33 are fixed to the radial arms 32, and define slots through each of which a spacer bar 52 extends.

The double damped flywheel operates in the following manner. The damper plate 30 moves relatively with respect to the guide rings 17 and 18 in the direction of the arrow f. Then, in a first phase, the totality of the springs 40A and 40B (i.e. in this example, three pairs of springs) are displaced until the stiffer springs 40B come into engagement on the corresponding thrust faces 20. Thereupon a second phase commences in which the springs 40A, each bearing indirectly on one of the thrust faces 20 through the spring 40B of the same pair, becomes compressed substantially by itself, because of the greater stiffness of the spring 40B, until the teeth 33 of the damper plate come into contact with the spacer bars 52. From this instant, the springs 40B begin to be compressed, while the springs 40A, each being in endwise engagement on two members which are connected to each other in rotation, remain compressed in the state in which they already were.

In certain applications, of course, the springs 40A and 40B may have values of stiffness very close to each other, and in this case the springs 40B undergo more compression during the second phase.

A double flywheel with two-stage operation is thus obtained. The teeth 33 and the spacer bars 52 together constitute a delayed action coupling means defining the initial clearance J for initial relative rotational displacement.

In accordance with another feature of the invention, the springs 40A and 40B are pivotally mounted on the thrust pads 51 by means of inserts 60. More precisely, all the springs 40A and 40B are mounted at each end on such inserts 60. Each of the latter has a centring boss 61 on which the end of the corresponding spring 40A or 40B is nested. The boss 61 has a shoulder portion 62 which includes on its front face a convex portion 63 of hemi-cylindrical cross section, which engages in a complementary concave portion 64 or 65 respectively of the corresponding thrust face 31 and thrust pad 51.

As a result, the thrust pads 51, and also the arms 32 of the damper plate 30, can be made smaller in the radial direction, and the axial outer ring portion 14 can be brought radially inward so as to lie immediately adjacent to the springs 40A and 40B which are securely retained.

In this example the concave portions 64 and 65 are formed generally so as to fit against the thrust faces 31 and the edges of the thrust pads 51.

The damper plate 30 carries two discs 71 and 72, and constitutes an axial spacer between these discs. Screws 76 connect the discs 71 and 72 to each other, passing through openings formed for this purpose in the damper plate 30.

The discs 71 and 72 also define a sealed cavity 73 which is closed at its base by the hub 8. The hub has radial teeth 74 engaging in the cavity 73 and projecting towards the damper plate 30, which is provided with teeth 75, themselves engaging in the cavity 73 and projecting towards the axis XX' of the flywheel. As can be seen from FIG. 2, the teeth 75 are arranged alternately, considered circumferentially, with the teeth 74. Calibrated passages exist between the teeth and, respectively, the inner periphery of the damper plate 30 and the outer periphery of the hub 8, and also between the teeth 74, 75 and the discs 71, 72. The cavity 73 is partly filled with a high viscosity fluid such as a silicone. The disc 72 is riveted to the plate 5.

Assembly takes place as follows. A sub-assembly is first of all built up, consisting of the disc 72, the plate 5 and the bearing 7. The body portion 16 of the hollow member 13 is then mounted on the disc 72 of this sub-assembly, after which the sub-assembly consisting of the damper plate 30, the phasing means 50 and springs 40 is constructed. The cavity 73 is then partly filled with the damping fluid referred to above, and is closed by means of the disc 71 and screws 76.

The hollow member 13 is then filled with a lubricating fluid, after which it is closed by the sheet metal face plate 11.

Sealing joints 80, indicated diagrammatically by rectangles in FIG. 1, are of course provided between the discs 71, 72 and the hub 8, between the hollow member 13 and the discs 71, 72, between the body portion 16 of the member 13 and the disc 72, between the axially extending outer ring portion 14 and the face plate 11, and finally between the face plate 11 and the hub 8.

The hollow member 13 with the face plate 11, which together constitute a shroud, define with the hub 8 and disc 72 a sealed cavity within which lies the cavity 73. It will be noted that the teeth 74 and 75, lying in the cavity 73, constitute the operative elements of a viscous damping means 90 carried by the damper plate 30 and disposed closer to the axis of rotation than the springs 40A, 40B, being located in the interior of the first cavity defined by the hollow member 13.

Figure 3:
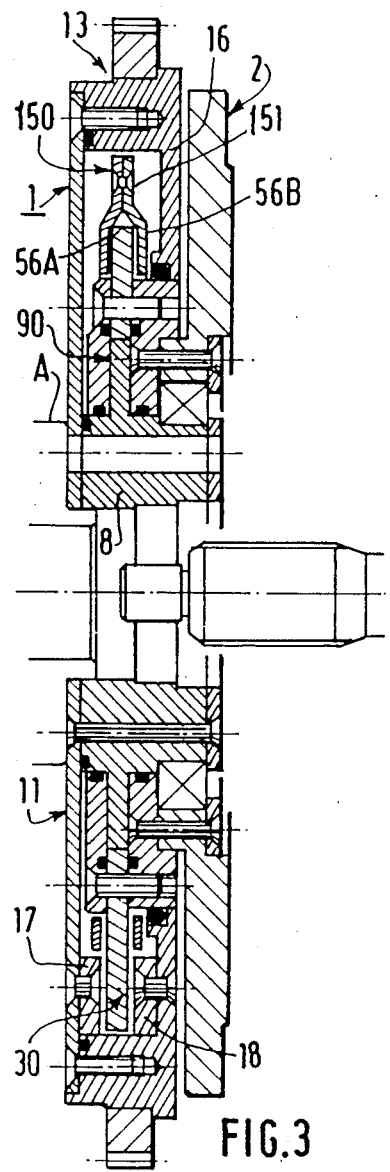

In the embodiment shown in FIGS. 3 and 4, the phasing means 150 comprise thrust pads 151 which are assembled together by means of a support ring.

The support, or phasing, ring, carrying the thrust pads 151, is divided into two rings 56A and 56B extending below the guide rings 17 and 18 and connected to each other by rivets passing through the pads 151, which extend above, i.e. radially outwardly of, the damper plate 30 and in the plane of the latter. The rings 56A and 56B are of somewhat serpentine form in cross-section, and are centred on the discs 71 and 72, in the same way as are the pads 51 in FIGS. 1 and 2 above. The outer ring portion 14 may of course be used for centring. It will be noted that in the embodiment of FIGS. 3 and 4, the springs 40A and 40B are identical to each other and no delayed action coupling means are provided.

The present invention is of course not limited to the embodiments described above. In particular, the springs 40A and 40B could be mounted without clearance between them and the thrust faces 20, and with clearance between the springs and the thrust faces 31.

Similarly, in FIGS. 3 and 4 it is possible to provide a two-stage arrangement as in FIGS. 1 and 2. In this case, the damper plate could be provided with protuberances, for example axially extending pins or pads which engage in oblong openings in the rings 56A and 56B.

The plate 5 may be spaced axially with respect to the disc 72, and axially located on the first mass. In this case, delayed action coupling means may be provided between the plate 5 and the disc 72. These means may for example comprise projections carried by the disc 72 and engaging with clearance in a generally oblong opening formed in the plate 5. The reverse is of course also possible, with the plate 5 then having tenons engaging in blind mortices formed in the disc 72.

Two damper plates 30 may be provided. These can be mounted freely on the discs 71 and 72 and be held axially in contact with radial flanges of the said discs by means of springs acting axially between the damper plates.

Finally, the blocks 19 may be made as part of rings connected to the outer ring portion 14, and the resilient means may be in the form of elastic blocks.

What is claimed is:

1. A double damped flywheel, particularly for an automotive vehicle, of the kind comprising two coaxial masses mounted rotatably with respect to each other against the action of circumferentially acting resilient means, wherein a first one of said masses includes two guide rings having first thrust faces for said resilient means and an axially extending outer ring portion, while the second one of said masses has at least one damper plate disposed axially between said guide rings and radially within said outer ring portion of the first mass, the damper plate having second thrust faces for said resilient means, the double damped flywheel being characterized by: phasing means for increasing the angular displacement between the two masses having a plurality of thrust pads, each of which is interposed circumferentially between two consecutive ones of said resilient means; and means mounting said phasing means for free rotation with respect to the guide rings and the damper plate, whereby the facing means are centered indirectly by the damper plate, each of said resilient means being divided into two operative elements, a plurality of inserts mounting said resilient means pivotally on said thrust pads, and viscous damping means for damping the movement between the two masses, the damper plate having a sealed cavity enclosing an operative part of the viscous damping means, the guide rings comprising a plurality of blocks having said first thrust faces and being carried by radial plate elements, one of which is the body portion of a hollow member, with the other radial plate element constituting a cover for the latter.

2. A double damped flywheel, particularly for an automotive vehicle, of the kind comprising two coaxial masses mounted rotatably with respect to each other against the action of circumferentially acting resilient means, wherein a first one of said masses includes two guide rings having first thrust faces for said resilient means and an axially extending outer ring portion, while the second one of said masses has at least one damper plate disposed axially between said guide rings and radially within said outer ring portion of the first mass, the damper plate having second thrust faces for said resilient means, the double damped flywheel being characterized by: phasing means for increasing the angular displacement between the two masses having a plurality of thrust pads, each of which is interposed circumferentially between two consecutive ones of said resilient means; and means mounting said phasing means for free rotation with respect to the guide rings and the damper plate, and viscous damping means for damping the movement between the two masses and having two discs carried by said damper plate which constitutes an axial spacer between these said discs whereby the phasing means are in two parts arranged on either side of said damper plate and internally centered by means of said discs, each of said resilient means being divided into two operative elements; and a plurality of inserts mounting said resilient means pivotally on the thrust pad.

3. A double damped flywheel according to claim 2, wherein said phasing means consist of two support rings with said thrust pads connected to each other radially outside said damper plate and in the plane of the latter.

4. A double damped flywheel according to claim 3, wherein said support rings are of serpentine form in cross section and are centered on said discs of said viscous damping means.

5. A double damped flywheel according to claim 3, wherein said support ring extends radially below said guide rings and connected to each other by rivets passing through said thrust pads of said phasing means.

6. A double damped flywheel according to claim 2, wherein said phasing means consist of separate thrust pads of the resilient means centered by said discs and connected to each other by spacers, and said thrust pads are disposed on either side of the plane of said damper plate.

7. A double damped flywheel according to claim 6, wherein said damper plate is provided with teeth for cooperating with said spacers after a clearance has been taken up.

8. A double damped flywheel according to claim 7, wherein said second thrust faces of said damper plate delimit a plurality of radial arms and in that said teeth are fixed to said radial arms.

* * * * *